CALLING LINE IDENTIFICATION SYSTEM

Filed Aug. 25, 1949

5 Sheets-Sheet 1

INVENTOR
BY J. W. GOODERHAM
P. C. Smith
ATTORNEY

INVENTOR
J. W. GOODERHAM
BY P. C. Smith
ATTORNEY

INVENTOR
BY J. W. GOODERHAM
P. C. Smith
ATTORNEY

CALLING LINE IDENTIFICATION SYSTEM

Filed Aug. 25, 1949

5 Sheets-Sheet 4

INVENTOR
BY J. W. GOODERHAM
P. C. Smith
ATTORNEY

Oct. 28, 1952 J. W. GOODERHAM 2,615,987

CALLING LINE IDENTIFICATION SYSTEM

Filed Aug. 25, 1949 5 Sheets-Sheet 5

INVENTOR
BY J. W. GOODERHAM
P. C. Smith
ATTORNEY

Patented Oct. 28, 1952

2,615,987

UNITED STATES PATENT OFFICE 2,615,987

CALLING LINE IDENTIFICATION SYSTEM

John W. Gooderham, Rye, N. Y., assignor to Bell Telephone Laboratories, Incorporated, New York, N. Y., a corporation of New York Application August 25, 1949, Serial No. 112,193

11 Claims. (Cl. 179—18)

This invention relates to calling line identification in automatic telephone systems.

The present invention is disclosed as an improvement over such systems as disclosed in the copending application of J. W. Gooderham, Serial No. 448,782, filed June 27, 1942, entitled, "Automatic Toll-Ticketing System." However, the present invention is applicable to other types of automatic telephone systems where line identification is required, and is not necessarily limited to the preferred embodiment.

In the system of the Gooderham disclosure, above referred to as illustrative of the prior art, identifying means, an idle identifier in that case, is seized by an extended connection for the purpose of identifying the directory number and class of service of the calling line. Each identifier is provided with a source of alternating current. A seized identifier applies the tone current to a conductor of the extended connection at the ticketing trunk end and extending back to the calling line. The identifier is arranged to detect the particular calling line circuit having therein a conductor carrying the said tone signal, thereby to identify the calling line associated with the extended connection. It is possible that such identification might be false in that the tone, causing the identification functions in the identifier to proceed, might have been impressed upon a particular idle line circuit due to some extraneous tone signal; i. e., for instance, a buzzing relay signal or other unintentional source of tone signal might become accidentally impressed upon the line circuit of an idle line thereby giving an identifier a false indication which would start the identification process.

The main purpose of the present invention is to prevent the identifying means from relying wholly upon the aforementioned indication that a true identification has been accomplished merely due to the single transmission of tone from the trunk end of the connection back over the calling line circuit to the detecting apparatus in the identifying means.

The invention contemplates means in the identifier, responsive to what appears to have been a complete identification of the calling line, for reversing the direction of transmission of the tone signal over the extended connection to recheck the detection.

According to the preferred embodiment, when the last item of line identification has been registered in the identifier, the latter reverses the tone transmission, sending it over the identified line circuit towards the trunk where the identifier detects its presence or absence. By this reversal, the identifier can check that the identified line is in fact the one which is connected to the trunk circuit, thereby precluding reliance upon what may have been an extraneous tone signal in the identified line circuit.

Under certain traffic conditions, a seized identifier makes a test for crossed line circuits prior to completion of an identification of any particular line. Under those circumstances, when the reverse test is made by the identifier according to the above, a successful reverse test will positively identify the identified line as the calling line.

Under other traffic conditions, a seized identifier will not test for crossed line circuits prior to completion of a line identification. When the reverse test is made under such circumstances, a successful test will not indicate positively that the identified line is the calling line (there may be a cross line circuit condition) but will be a positive determination that the identified line is connected to the trunk over which the tone was originally transmitted for identification purposes.

Under either of the above conditions, the invention provides means for checking the existence of a connection between the identified line circuit and the trunk connection thereby to preclude reliance upon identifications caused by signal tones extraneous to the identification process being performed. Furthermore, even though the above-mentioned crossed line circuit test is not made prior to the reverse tone test, the latter will be a reliable test that the identified line is the calling line due to the remoteness and rarity of a crossed line circuit condition.

The invention, having been described generally above, will be described in detail hereinafter in connection with an embodiment thereof shown in the drawings, of which:

Fig. 1 shows substations and a line finder associated with the circuits thereof; a train of selectors by means of which the line finder may have access to a ticketing or other type of trunk; a section of thousands and hundreds transformer coil fields with an associated cross-connecting rack in the common number circuit; and a group of hundreds group connectors for the No. 9 thousands group of lines;

Figures 1, 6:
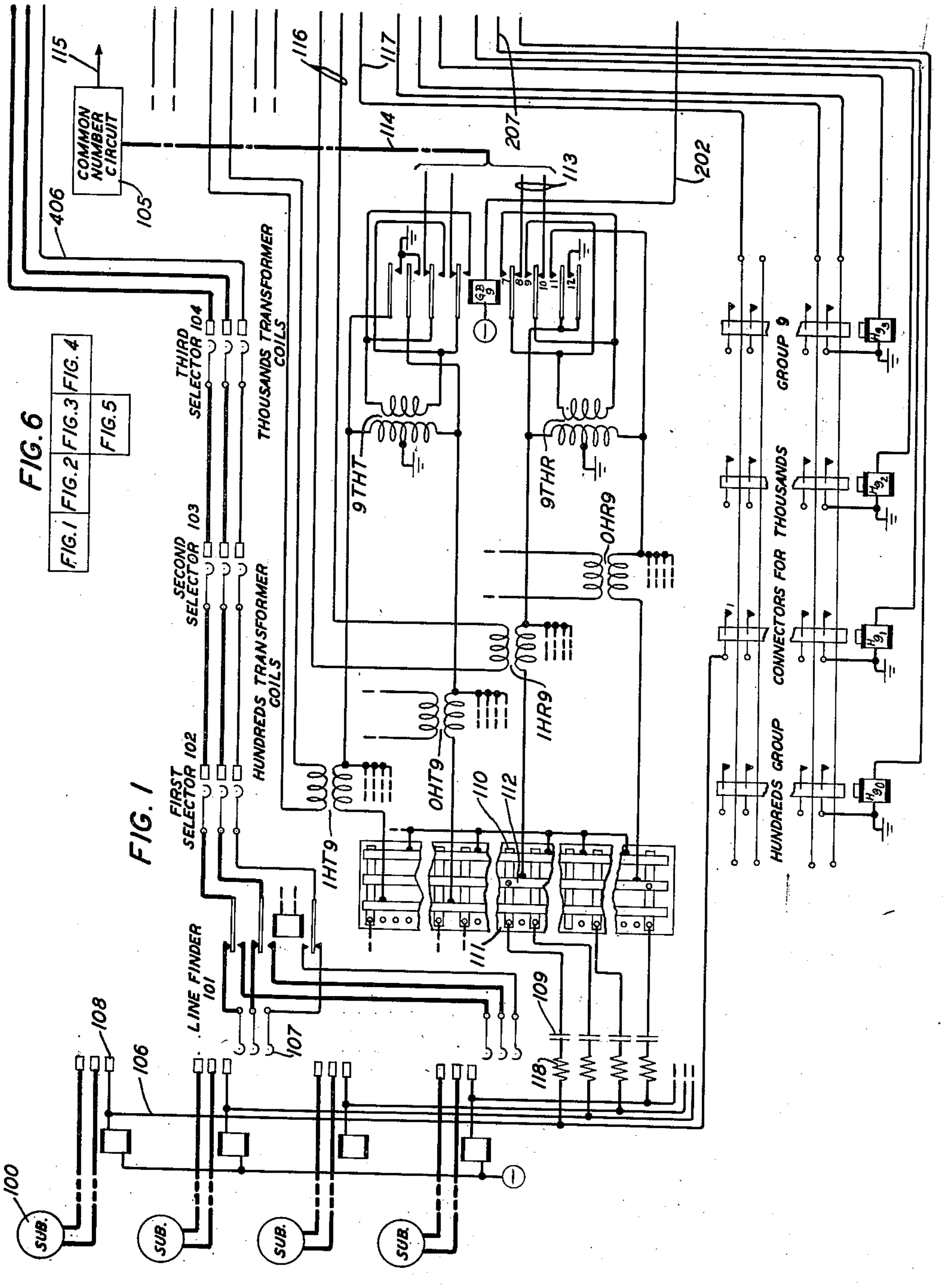
Fig. 6 shows the manner in which the other figures should be arranged to form the complete drawing disclosure.

As mentioned above, the present invention is an improvement over such identification systems as disclosed by Gooderham. The present circuits have been adapted to Gooderham's disclosure and only sufficient details thereof have been shown and will be described as are necessary to an understanding of the present invention.

In the system of the Gooderham disclosure, the thousands group (the digit value of the thousands digit of the directory numericals) of the calling line is identified and registered; the thousands group registration operates a thousands group connector through which the hundreds group (hundreds digit of the calling line) is identified and registered; the registration of the hundreds group operates a hundreds group connector whereby the tens and units identification proceeds; the tens registration operates a units connector to in turn register the units digit. Up to this point there is no change from the aforesaid system and such preliminary description will be dealt with briefly, reference being made to the Gooderham disclosure for details. After the units registration, the present invention necessitates a change of circuits and functioning thereof with respect to the aforesaid system. Therefore, such description will be dealt with in more detail.

It will be assumed that a call is initiated by subscriber 100 which is a ring party of a two-party flat rate line and whose directory numericals, to be identified, are 9190.

*Selection of a trunk and connecting an identifier thereto*

When subscriber 100 removes his receiver preparatory to initiating a call, a line finder 101 associated therewith hunts for the calling line in the well-known manner. When line finder 101 finds and connects to the calling line, the subscriber 100 is provided with the usual dial tone whereupon subscriber 100 proceeds to dial the digits of the called subscriber. It has been assumed, as shown, that the first three digits are utilized in directing the respective first selector 102, second selector 103, and third selector 104 to seize an idle ticketing trunk such as trunk 400 of Fig. 4. Trunk 400 will select and seize an idle sender 401 and will interconnect therewith over sender-trunk finder 402. Sender 401 selects and seizes an idle line identifier, such as disclosed in Figs. 2, 3, 4 and 5, connecting therewith over a sender-identifier connector such as 403. The identifier, having been informed through sender 401 as to which trunk is the calling trunk, connects to such trunk 400 via an identifier-trunk connector such as 404.

*Extending the connection*

Since the first three called number digits were utilized in directing the selectors, the fourth digit will be registered in trunk 400 and the remainder in sender 401. The trunk 400 transmits to sender 401 by way of the identifier whichever digit has been registered therein. Likewise, the identifier, by means of identifying the sleeve relay operated in trunk 400, decodes the digits expended in the selector stages and transmits same to the sender 401.

The sender 401 then proceeds, as described in the Gooderham disclosure, to set up the called subscriber connection.

*Thousands group identification*

As soon as the common number circuit 105 is idle, the identifier will seize same thereby interconnecting itself with the thousands coils of a tip or ring field depending upon the party identification supplied to the identifier by sender 401 (ring party in the assumed case).

As soon as the identifier has made the necessary connections with the ring field of thousands coils through the common number circuit 105, relay TC(4) is operated in the identifier. (The nomenclature "TC(4)" indicates relay, or apparatus, "TC" shown in Fig. 4. This type of reference character will be employed, in part, throughout the subsequent description.) Relay TC(4), upon operating, operates relay OSR(4) in an obvious circuit. Relay OSR(4), upon operating, applies a 270-cycle tone to the sleeve conductor 106 of subscriber 100 in a circuit extending from the source 405 of 270-cycle tone, contact 2 of relay OSR(4), contact 2 of relay AD4(4), contact of identifier-trunk connector 404, sleeve 406 of trunk 400, sleeve terminals and brushes and conductors of selectors 104 and 103 and 102, sleeve brush 107 of line finder 101, sleeve terminal 108, to the sleeve conductor 106 of the line circuit of subscriber 100.

The 270-cycle tone flows over conductor 106, through resistance 118 and condenser 109, to horizontal strip 110 of cross-connecting rack 111, to vertical strip 112 through the interconnecting screw, through the primary winding of hundreds coil 1HR9(1), to ground through the upper half of the primary winding of thousands coil 9THR(1). The tone continues to flow from the secondary winding of coil 9THR(1), over contacts 8 and 10 of group busy relay GB9(1), conductors 113 and over cable 114 to the common number circuit, thence in the direction of arrow 115 to the identifier where the thousands group 9 is registered. This operation is fully described in the Gooderham disclosure.

*Crossed sleeve test*

As fully described in the Gooderham disclosure, during light traffic periods, the identifier, upon detecting the tone in a particular thousands group will proceed to test all other thousands groups for the simultaneous presence therein of the same tone. This test is to detect any crossed sleeves prior to further identification in order to preclude false identification in case the first thousands group tone existed therein due to a cross-connection between sleeves of different lines. However, during heavy traffic conditions, the crossed sleeve test is eliminated in order to reduce identifier holding time. The crossed sleeve test is mentioned here because whether or not it has been performed has a bearing upon the meaning of the results of the novel sleeve lead check to be described hereinafter.

*Hundreds group identification*

Upon the registration in the identifier of the thousands group number 9, a circuit is completed for operating the preference relay IPF(2) of the thousands group connector for the No. 9 thousands group, the identifier disclosed partly in Figs. 2, 3, 4 and 5 having been assumed to be the first identifier of the plurality thereof associated with the first, intermediate and last preference relays IPF(2), IPI(2) and IPL(2). The circuit for operating relay IPF(2) extends from battery (not shown) in the identifier under control of the thousands group register, over cable 200 of Fig. 2, conductor 201, through the winding of relay IPF(2), to ground over the normal contacts, such as 5 and 3, of all other preference relays, assuming all other such relays to be normal indicating that the No. 9 thousands number connector is idle.

Relay IPF(2), upon operating, locks to ground over its contact 6 and operates the thousands group connector relay TH9F(2) in an obvious circuit over contact 4 of relay IPF(2). Relay TH9F(2), upon operating, completes a circuit for operating the group busy relay GB9(1) extending from ground, over contact 19 of relay TH9F(2), conductor 202, to battery through the winding of relay GB9(1). Relay GB9(1), upon operating, short-circuits, over its contacts 7 and 9, the secondary winding of coil 9THR(1), thereby to prevent any other identifier from receiving tone signals to identify the No. 9 thousands group. At contacts 8 and 10 thereof, relay GB9(1) opens the tone leads 113 to the common number group circuit. Furthermore, relay GB9(1) accomplishes the same short-circuiting of secondaries of both tip and ring coils in the No. 9 thousands coil field. The operation of connector relay TH9F(2) completes the tone circuit for hundreds group identification from the secondary winding of hundreds coil 1HR9(1), over conductors 116, contacts 7 and 8 of relay TH9F(2), conductors 203, and over cable 204 to the identifier where the hundreds group 1 is registered, as previously described in the Gooderham disclosure.

*Tens group identification*

Figure 2:
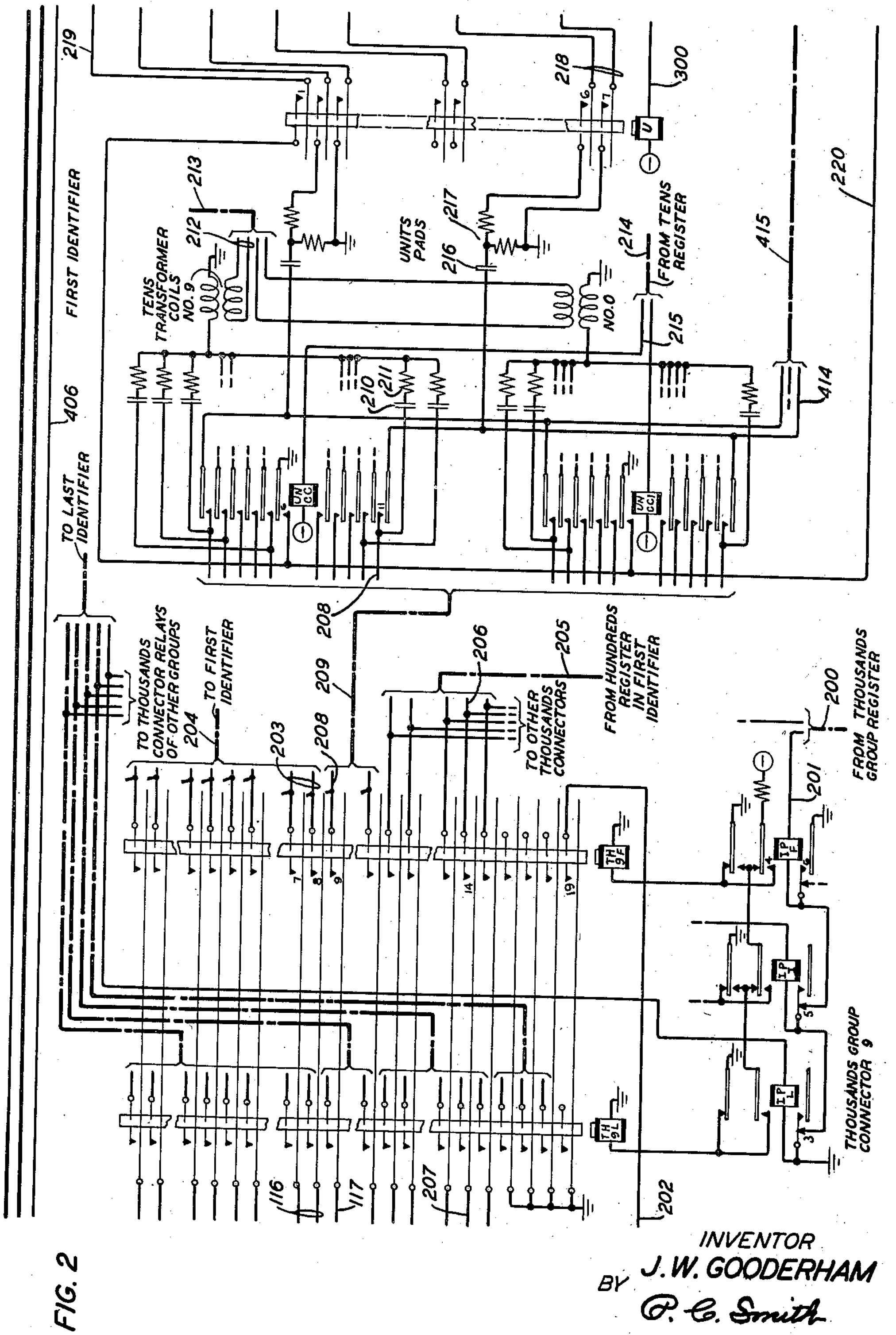
Fig. 2 shows, in the left portion thereof, the thousands group connector circuit for the No. 9 thousands group; in the central portion thereof, units connector relays with associated tens transformer coils and units pads; and, in the right portion, a units switching relay; all part of a line identifier.

As a result of the registration of hundreds group 1 in the No. 9 thousands group, the identifier completes a circuit for operating the indicated hundreds group connector H91(1) over a circuit extending from battery (not shown) in the identifier under the control of the hundreds group identification register therein, over cable 205 of Fig. 2, conductor 206, contact 14 of connector relay TH9F(2), conductor 207, to ground through the winding of hundreds group connector relay H91(1). Relay H91(1) operates to extend the line sleeve lead 106, carrying the tone, to the tens group and units identification coils and pads shown in Fig. 2.

The tone current flows from sleeve conductor 106, over contact 1 of connector relay H91(1), conductor 117, contact 9 of connector relay TH9F(2), conductor 208, cable 209, conductor 208, condenser 210, resistance 211, to ground through the primary winding of tens coil No. 9(2). The tone current continues from the secondary winding of tens coil No. 9(2), over conductors 212, and cable 213 to the identifier where it is detected to thereby operate a No. 9 tens register relay (not shown) therein.

*Units identification*

At the completion of the tens group identification, relay AD3(4) is operated. As soon as relay AD3(4) operates, and as soon as the control circuit, shown partly in Fig. 5, has returned to normal as evidenced by the operation of relay N(5), and provided all units register relays U0(4) to U9(4) are normal, a circuit is completed for operating start relay ST4(4), extending from battery, through the winding of relay ST4(4), contacts 1 of relays U9(4) to U0(4), conductor 407, contact 6 of relay SCK(5), contact 6 of relay N(5), conductor 500, contact 1 of relay RT4(4), to ground over contact 1 of relay AD3(4). Relay ST4(4) locks over its contact 4, contact 1 of relay RT4(4), to ground over contact 1 of relay AD3(4). Relay N(5) was operated in a circuit extending from ground, over contact 5 of relay TR2(5), contact 3 of relay TR4(5), contact 6 of relay TS2(5), to battery through the winding of relay N(5). The operation of start relay ST4(4) completes circuits for operating the units switching relay U(2) and U(3) for connecting the detectors of Fig. 3 between the units pads of Fig. 2 and the units registers of Fig. 4. Such circuits extend from ground, over contact 2 of relay AD3(4), contact 7 of relay RL4(4), contact 7 of relay AD4(4), contact 5 of relay ST4(4), conductor 408, to battery through the winding of relay U(3), and in parallel over conductor 300 to battery through the winding of relay U(2).

A circuit is completed from the tens group register (not shown) of the identifier for operating one of the relays UNCC(2), UNCC1(2), etc., extending from ground (not shown), over cable 214, conductor 215, to battery through the winding of relay UNCC(2). Relay UNCC(2), upon operating, extends the tone path from conductor 208, over contact 11 of relay UNCC(2), through condenser 216 of pad 217, contacts 6 and 7 of relay U(2), conductors 218 to detector No. 0(3). The operation of switching relay U(3) extends operating circuits from the register relays OR0(3) to OR9(3) of the detector circuits to the units register relays U0(4) to U9(4) of Fig. 4. The circuit is now in condition to make the units identification. Also, upon the operation of switching relay U(3), a circuit was completed for operating relay UT(5) extending from ground, over contact 10 of relay U(3), conductor 301, to battery through the winding of relay UT(5). Relay UT(5), upon operating, arranges for the necessary units timing intervals by short-circuiting, over its contact 3, the resistance EN(5) associated with the timing tube REG(5).

Upon the operation of relay UNCC(2), a circuit is completed for operating relay TS1(5) from ground, over contact 6 of relay UNCC(2), contact 1 of relay U(2), conductor 219, contact 9 of relay U(3), conductor 302, to battery through the winding of relay TS1(5). Relay TS1(5), upon operating, operates relay TS2(5) over a circuit extending from battery, through the winding of relay TS2(5), contact 4 of relay TS1(5), contact 9 of relay TR2(5), conductor 501, contact 6 of relay OR9(3), contact 6 of relay OR4(3), to ground over contact 5 of relay OR0(3). Relay TS2(5) locks over its contact 4 to ground over contact 6 of relay TS1(5) and releases relay N(5).

Figure 3:
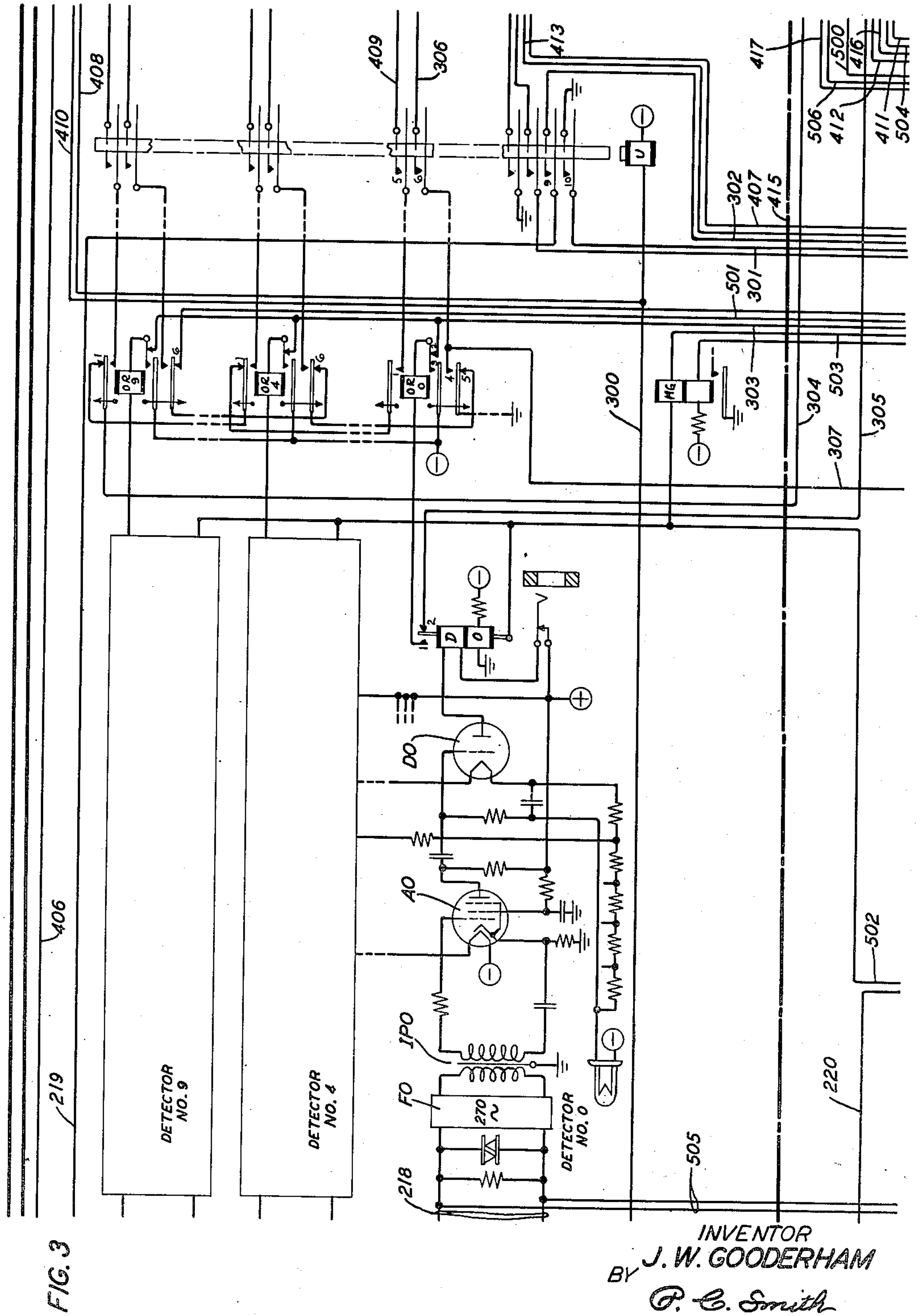
Fig. 3 shows three detector circuits, one of which, detector No. 0, is shown in detail, register relays to be operated by associated detectors, and another units switching relay; all part of a line identifier.
Figure 4:
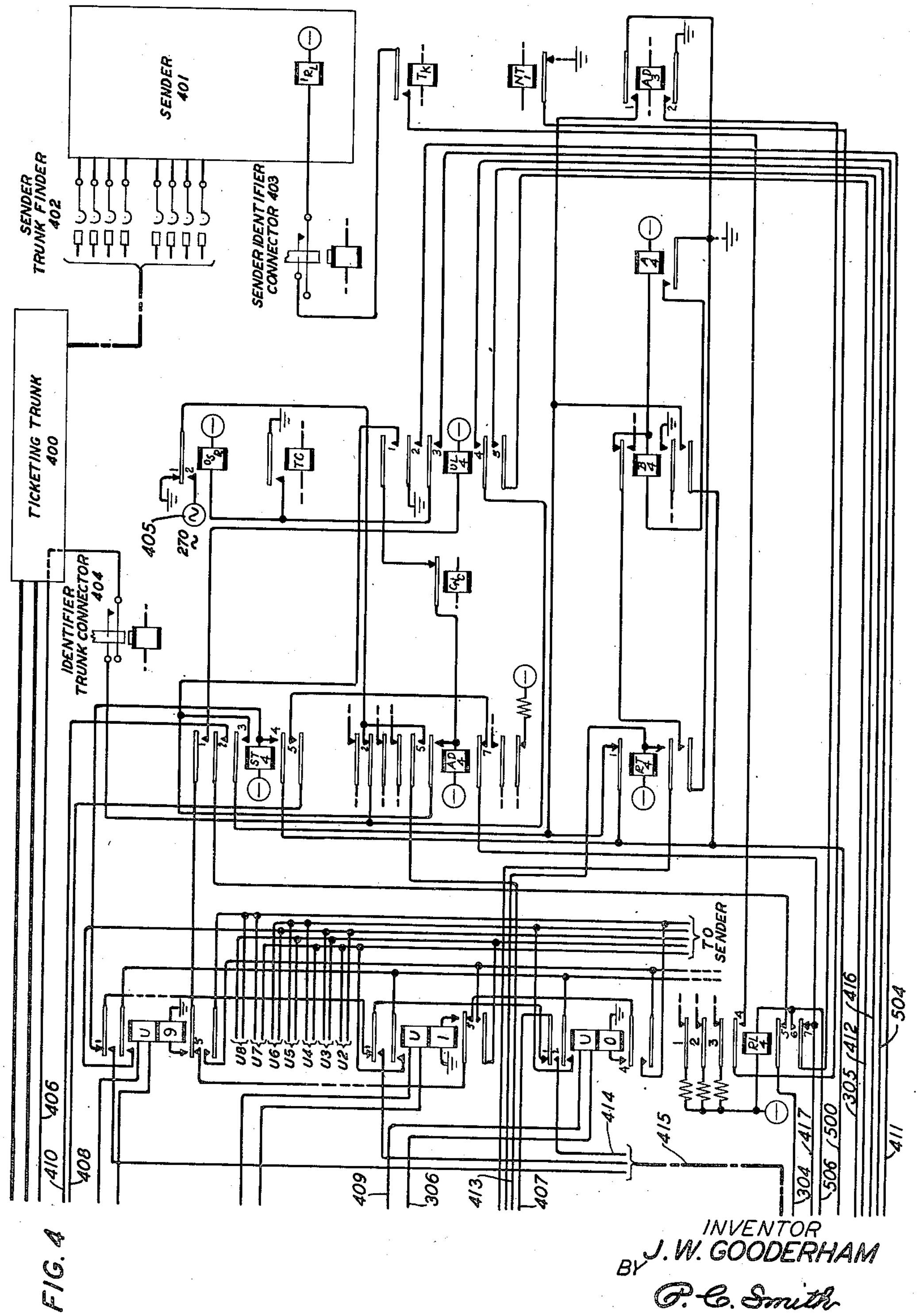
Fig. 4 shows a ticketing trunk as a block, a sender to which the trunk gains access through a sender-trunk finder, a sender-identifier connector through which the sender makes connection to a line identifier, and an identifier-trunk connector for interconnecting a line identifier with the trunk, units register relays in the left portion, and various control relays of an identifier.
Figure 5:
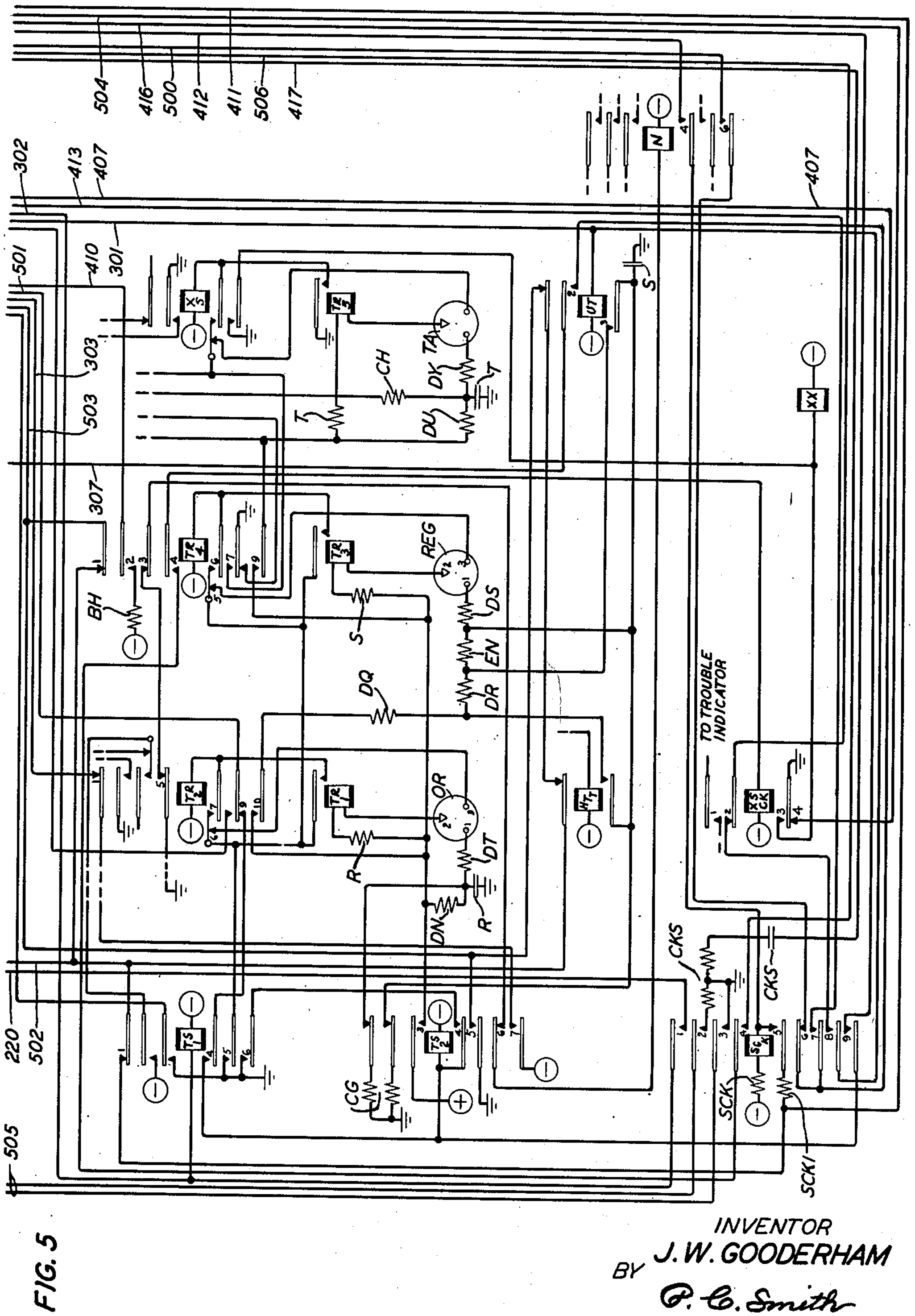
Fig. 5 shows control and timing relays and apparatus of an identifier.

Relay TS2(5), upon operating, starts a timing period for controlling the detectors of Fig. 3. Such timing period is the "OR" timing period controlled by tube OR(5) and relays TR1(5) and TR2(5). Another timing period started at the end of the "OR" period is the "REG" period controlled by the tube REG(5) and relays TR3(5) and TR4(5). The "OR" period is to permit the tone signal to be detected by detector No. 0(3) to operate relays DO(3) and OR0(3). At the end of the "OR" period all operating circuits are opened for the relays OR0(3) to OR9(3) to permit those which may have been operated due to surges during the "OR" timing period to release. At the end of the "REG" period, a circuit is completed, under the control of only one relay, OR0(3) in this case, to operate the units register relay U0(4). A charging circuit is completed for condenser R(5) of the "OR" timer from positive battery, over contact 3 of relay TS2(5), through resistance DN(5), to ground through condenser R(5). Positive battery is also extended through resistance R(5) and through the winding of relay TR1(5) to main anode 2 of tube OR(5). The cathode 3 of tube OR(5) is connected to ground over contact 6 of relay TR2(5) and contact 5 of relay TS1(5). The "OR" period comprises the time during which it takes condenser R(5) to acquire sufficient charge to fire tube OR(5) and thereby operate relays TR1(5) and TR2(5). During this time interval, the tone signal passes over conductors 218, through filter FO(3) of detector No. 0(3), and through the primary winding of the transformer IPO(3). The tone is amplified by amplifier AO(3) and detected by detector DO(3) thereby to operate detector relay DO(3) by means of its upper winding. Relay DO(3), upon operating, completes a circuit for operating relay OR0(3) from ground, over contact 5 of relay TS2(5), contact 1 of relay TR4(5), conductor 502, armature of relay DO(3), contact 1 of relay DO(3), winding of relay OR0(3), contact 2 of relay OR0(3), conductor 303, contact 1 of relay TR2(5), to battery over contact 7 of relay TS2(5). Relay OR0(3) operates and locks to battery over its contact 3.

When condenser R(5) has acquired sufficient charge to fire tube OR(5), the latter fires through the winding of relay TR1(5), operating that relay. Relay TR1(5), upon operating, operates relay TR2(5) in a circuit extending from ground, over contact 5 of relay TS1(5), contact of relay TR1(5), to battery through the winding of relay TR2(5), which thereupon operates and locks over its own contact 7 to ground over contact 5 of relay TS1(5). Relay TR2(5), upon operating, removes at its contact 6 the cathode ground for tube OR(5), thereby extinguishing tube OR(5) and releasing relay TR1(5). Relay TR2(5) removes at its contact 1 the operating battery for relays OR0(3) to OR9(3).

Relay TR2(5), upon operating, starts the "REG" timing period by completing a charging circuit for condenser S(5) extending from positive battery, over contact 3 of relay TS2(5), contact 10 of relay TR2(5), resistance DQ(5), resistance DR(5), contact 3 of relay UT(5), to ground through condenser S(5). Cathode 3 of tube REG(5) is grounded over contact 5 of relay TR4(5) and contact 5 of relay TS1(5). Relay TR3(5) is in series between main anode 2 of tube REG(5) and positive battery over contact 3 of relay TS2(5) through resistance S(5). During the REG period any relays OR0(3) to OR9(3) which operated due to surges during the "OR" timing period will release.

At the end of the "REG" period the charge on condenser S(5) will fire tube REG(5) thereby to operate relay TR3(5). Relay TR3(5), in operating, operates relay TR4(5) in a circuit from ground, over contact 5 of relay TS1(5), contact of relay TR3(5), to battery through the winding of relay TR4(5). Relay TR4(5), upon operating, extinguishes tube REG(5) to thereby release relay TR3(5) by removing ground from cathode 3 of tube REG(5) at contact 5 of relay TR4(5). Relay TR4(5), in the meantime, locks over its contact 6 to ground over contact 5 of relay TS1(5). Upon the operation of relay TR4(5), relay OR0(3) is held operated by ground extending from contact 5 of relay TS2(5), conductor 503, winding of marginal relay MG(3), armature of relay DO(3) and contact 1 of relay DO(3). A circuit is also completed for operating units register relay U0(4) extending from ground, over contact 4 of relay OR0(3), contact 6 of units switching relay U(3), conductor 306, upper winding of relay U0(4), conductor 409, contact 5 of relay U(3), contacts 1 of relays OR0(3) to OR9(3), conductor 304, contact 5 of relay RL4(4), contact 2 of relay ST4(4), conductor 410, to battery over contact 2 of relay TR4(5) and through resistance BH(5). Relay U0(4) operates and locks in a circuit extending from ground, through the lower winding of relay U0(4), contact 4 of relay U0(4), contacts 5 of relays U1(4) to U9(4), contact 1 of relay ST4(4), to battery through the winding of relay UL4(4), which relay operates in such circuit.

*Sleeve lead check*

After the complete number has been identified, as evidenced by the operation and locking of the units register relay U0(4), a check is made to determine that the identified sleeve conductor is in fact a sleeve conductor which is connected to the ticketing trunk 400 associated with the identifier which made the identification. If the crossed sleeve test, previously mentioned has been made, then the sleeve lead check will, if a successful check ensues, determine that the identified sleeve conductor is in fact the only one connected to the trunk 400 and that no extraneous tone has caused the identification. If the abovementioned crossed sleeve test has not been performed, the sleeve lead check will, if a successful check ensues, determine only that the identification was caused by a tone transmitted through a connection between the trunk 400 and said sleeve conductor. A successful check under the latter circumstances will not necessarily mean that there is no crossed sleeve condition and thus will not necessarily mean that the sleeve identified is the sleeve of the line which initiated the connection. However, it will determine whether or not the identification was caused by a true identifier tone connection or by a transient phenomenon unintentionally interpreted as identifying tone current. Furthermore, the probability of crossed sleeves is remote as such occurrences are rare.

Relay UL4(4), upon operating, completes a holding circuit for keeping relay OSR(4) operated. Such circuit extends from ground, over contact 4 of relay XSCK(5), conductor 504, contact 3 of relay UL4(4), to battery through the winding of relay OSR(4). Relay UL4(4) operates relay AD4(4) in a circuit extending from battery, through the winding of relay AD4(4), contact of relay CNC(4), contact 1 of relay UL4(4), contact 3 of relay ST4(4), to ground over contact 1 of relay AD3(4). Relay AD4(4), upon operating, opens at its contact 7, the operating circuit for the units switching relays U(2) and U(3), which relays thereupon release disconnecting both ends of detector No. 0(3). Relay DO(3) thereupon releases along with relay OR0(3). The release of relay U(3) releases relays UT(5) and TS1(5), the latter in turn releasing relays TS2(5), TR2(5) and TR4(5), thereby returning the control circuit of Fig. 5 to normal. Relay N(5) operates, to indicate this normal condition, in a circuit previously traced.

Relay N(5), upon reoperating, completes a circuit for operating relay SCK(5), extending from ground, over contact 2 of relay UL4(4), conductor 411, contact 1 of relay TS1(5), conductor 502, armature of relay DO(3), contact 2 of relay DO(3), conductor 305, contact 5 of relay UL4(4), conductor 412, contact 4 of relay N(5), to battery through the winding of relay SCK(5) and resistance SCK(5). Relay SCK(5) locks over its contact 5, resistance SCK1(5), conductor 411, to ground over contact 2 of relay UL4(4).

The operation of relay SCK(5) completes a tone path from the source 405, over contact 2 of relay OSR(4), contact 5 of relay AD4(4), conductor 413, contact 7 of relay SCK(5), conductor 407, contact 2 of units register relay U0(4), conductor 414, cable 415, contact 11 of relay UNCC(2), conductor 208, cable 209, conductor 208, contact 9 of connector relay TH9F(2), conductor 117, contact 1 of connector relay H91(1), sleeve conductor 106 of the line circuit of subscriber 100, sleeve bank terminal 108, line finder sleeve brush 107, sleeve 406 of trunk 400, contact of connector 404, contact 4 of relay UL4(4), conductor 416, condenser CKS(5), pad CKS(5), contacts 2 and 3 of relay SCK(5), conductors 505, to the input of detector No. 0(3).

In the meantime, upon the operation of relay SCK(5), a circuit was completed for reoperating relay TS1(5), from ground, over contact 6 of relay UNCC(2), conductor 220, contact 1 of relay SCK(5), to battery through the winding of relay TS1(5), which thereupon operates. A circuit was thereupon completed for reoperating relays TS2(5) and UT(5), extending from ground over contact 5 of relay OR0(3), contacts 6 of relays OR4(3) and OR9(3), etc., conductor 501, contact 9 of relay TR2(5), contact 4 of relay TS1(5), to battery through the winding of relay TS2(5) and in parallel over contact 9 of relay SCK(5), to battery through the winding of relay UT(5). Relays UT(5) and TS2(5) lock to a common ground over contact 4 of relay TS2(5), and contact 6 of relay TS1(5).

During the "OR" and "REG" timing periods, the tone on conductors 505 is amplified by amplifier AO(3), and detected by detector DO(3) to thereby operate relay DO(3). Relay DO(3) upon operating completes a circuit previously traced for operating relay OR0(3). The reoperation of relay OR0(3) is a successful check that the identified sleeve conductor is connected to trunk 400. Relay OR0(3), upon operating, completes a circuit for operating relay RL4(4) extending from ground, over contact 4 of relay OR0(3), conductor 307, contact 2 of relay UT(5), contact 8 of relay SCK(5), contact 2 of relay XSCK(5), conductor 506, to battery through the winding of relay RL4(4). Relay RL4(4) locks to ground over its own contact 6 and contact 2 of relay AD3(4).

When the identifier has completed its functions, a circuit is completed from ground, over the contact of relay NT1(4), contact 4 of relay RL4(4), the contact of relay TK(4), contact of connector 403 to operate relay IRL(4) in sender 401 as a signal that the identifier has completed its functions. It is to be noted that such signal cannot be sent unless relay RL4(4) has been operated as an indication that the sleeve lead check has been performed successfully.

In the event that the tone was not detected on the sleeve lead check test, a circuit would have been completed (at the end of the "REG" period when relay TR4(5) operates) from ground, over contact 2 of relay AD3(4), contact 7 of relay RL4(4), conductor 417, contact 4 of relay SCK(5), contact 4 of relay TR4(5), to battery through the winding of relay XSCK(5). The operation of relay XSCK(5) would complete, over its contact 3, a circuit for operating relay XX(5) which will thereupon cause a trouble record to be taken of the condition of the identifier at the time of the trouble.

Assuming that relay RL4(4) operates to indicate a successful sleeve lead check test, the operation of relay RL4(4) opens at its contacts 1, 2 and 3 the operating circuits for the hundreds group registers (not shown), the thousands group connector preference relay IPF(2), and the hundreds group connector relay H91(1), whereupon the associated circuits release to completely release the No. 9 thousands number circuit for the use of other identifiers.

As soon as the identifier has transmitted the identification information to sender 401 in accordance with the Gooderham disclosure, the identifier will be released along with such connectors as 403 and 404. All apparatus in the identifier will thereupon be returned to normal.

Sender 401 will complete the extension of the connection and will perform the printing of the toll ticket by means of a ticketing means (not shown) in trunk 400.

The above described embodiment of the present invention, as will be appreciated by those skilled in the art, is applicable to systems other than as disclosed by Gooderham referred to; and, the fact that such invention is disclosed as preferably embodied in the system of the Gooderham disclosure is not intended to limit its scope.

What is claimed is:

1. In a telephone system, a plurality of lines, a plurality of trunks, means for extending a connection from any calling one of said lines over any idle one of said trunks, and line identifying means associable with said connection for determining the identity of said calling line, said identifying means comprising a source of signal current and means for applying current from said source to the trunk end of said extended connection and means associable with the calling line end of said extended connection for detecting said signal and means responsive to the detection of said signal for reversing the connection of said source and of said detecting means to said trunk and to said calling line end of said connection and means to indicate whether or not reverse detection of said signal occurs.

2. In a telephone system, a plurality of lines, a plurality of trunks, means for extending a connection from any calling one of said lines over any idle one of said trunks, and line identifying means associable with said connection for determining the identity of said calling line, said identifying means comprising a source of signal current and means for applying current from said source to a conductor of the trunk end extending back to the calling end of said extended connection and means associable with the calling line ends of said lines for detecting said signal on a conductor of one of said lines and means responsive to the detection of said signal for reversing the connection of said source and of said detecting means to said conductor of said trunk and to said conductor of the calling line end of one of said lines of said extended connection and means to indicate whether or not reverse detection of said signal occurs.

3. In a telephone system, a plurality of lines, a plurality of trunks, means for extending a connection from any calling one of said lines over any idle one of said trunks, and a plurality of line identifiers any idle one of which is associable with said connection for determining the identity of said calling line, said identifier comprising a source of signal current and means for applying current from said source to the trunk sleeve conductor of said extended connection and means associable with said lines for detecting said signal on the sleeve conductor of one of said lines and means responsive to said detection for reversing the connections of said source and of said detecting means to the said sleeve conductors of said trunk and of said identified line and means to indicate whether or not reverse detection of said signal occurs and means responsive to an indication of the absence of said reverse detection to prevent the completion of the call.

4. In a telephone system, a plurality of lines, a plurality of trunks, means for extending a connection from any calling one of said lines over any idle one of said trunks, and a plurality of line identifiers any idle one of which is associable with said connection for determining the identity of said calling line, said identifier comprising a source of signal current and means for applying current from said source to the trunk sleeve conductor of said extended connection and means associable with said lines for detecting said signal on the sleeve conductor of any one of said lines and means responsive to said detection for reversing the connections of said source and of said detecting means to the said sleeve conductors of said trunk and of said identified line and means to indicate whether or not reverse detection of said signal occurs and means responsive to an indication of the presence of the said reverse detection to permit the completion of the call.

5. In a telephone system, a plurality of lines, a plurality of trunks, means for extending a connection from any calling one of said lines over any idle one of said trunks, and a plurality of line identifiers any idle one of which is associable with said connection for determining the directory number of said calling line, said identifier comprising a source of signal current and means for applying current from said source to the trunk sleeve conductor of said extended connection and means associable with said lines for detecting said signal on the sleeve conductor of one of said lines and means responsive to such detection for identifying the digits of the directory number of the line associated with said sleeve conductor and means responsive to the identification of the units digit of said directory number for reversing the connection of said source and of said detecting means to the said sleeve conductors of said trunk and of said identified line and means to indicate whether or not reverse detection of said signal occurs and means responsive to an indication of the absence of said reverse detection to prevent the completion of the call and means responsive to an indication of the presence of the said reverse detection to permit the completion of the call.

6. In a telephone system, a plurality of lines, a plurality of trunks, means for extending a connection from any calling one of said lines over any idle one of said trunks, means for indicating whether the traffic serviced by said lines and by said trunks represents a heavy or a light traffic condition, and a plurality of line identifiers any idle one of which is associable with said lines and with said trunk for determining the directory number of said calling line, said identifier comprising a source of signal current and means for applying current from said source to the trunk sleeve conductor of said extended connection and means associable with said lines for detecting said signal on the sleeve conductor of one of said lines and means responsive to such detection for initiating the identification of the digits of the directory number of the line associated with said sleeve conductor and means operable under light traffic conditions following the identification of the thousands digit to determine whether or not said sleeve conductor is connected with a sleeve conductor of another line and respectively to prevent and to allow completion of the identification and means responsive to the identification of the units digit of said directory number for reversing the connection of said source and of said detecting means to the sleeve conductors of said trunk and of said identified line and means to indicate whether or not reverse detection of said signal occurs and means responsive to an indication of the absence of said reversed detection to prevent the completion of the call and means responsive to an indication of the presence of said reverse detection to permit the completion of the call.

7. In a telephone system, a plurality of lines, at least one idle trunk, means for extending a connection from any calling one of said lines over said trunk, and line identifying means associable with said connection for determining the identity of said calling line, said identifying means comprising a source of signal current and means for applying current from said source to one end of said extended connection and means associable with the other end of said extended connection for detecting said signal and circuit means responsive to the detection of said signal for reversing the connection of said source and of said detecting means to the ends of said connection and means to indicate whether or not reverse detection of said signal occurs.

8. In a telephone system, a plurality of lines, a plurality of trunks, means for extending a connection from any calling one of said lines over any idle one of said trunks, and a plurality of line identifiers any idle one of which is associable with said connection for determining the identity of said calling line, said identifier comprising a source of signal current and means for applying current from said source to the trunk sleeve conductor of said extended connection and means associable with said lines for detecting said signal on the sleeve conductor of one of said lines and means responsive to said detection for reversing the connection of said source and of said detecting means to the said sleeve conductor of said trunk and of said identified line and means for indicating whether or not reverse detection of said signal occurs and means responsive to an indication of the absence of said reverse detection to prevent the completion of the call.

9. In a telephone system, a plurality of lines, a plurality of trunks, means for extending a connection from any calling one of said lines over any idle one of said trunks, and a plurality of line identifiers any idle one of which is associable with said connection for determining the identity of said calling line, said identifier comprising a source of signal current and means for applying current from said source to the trunk sleeve conductor of said extended connection and means associable with said lines for detecting said signal on the sleeve conductor of any one of said lines and means responsive to said detection for reversing the connection of said source and of said detecting means to the said sleeve conductor of said trunk and of said identified line and means for indicating whether or not reverse detection of said signal occurs and means responsive to an indication of the presence of said reverse detection to permit the completion of the call.

10. In a telephone system, a plurality of lines, a plurality of trunks, means for extending a connection from any calling one of said lines over any idle one of said trunks, and a plurality of line identifiers any idle one of which is associable with said connection for determining the directory number of said calling lines said identifier comprising a source of signal current and means for applying current from said source to the trunk sleeve conductor of said extended connection and means associable with said lines for detecting said signal on the sleeve conductor of one of said lines and means responsive to such detection for identifying digits of the directory number of the line associated with said sleeve conductor and means responsive to the identification of the units digit of said directory number for reversing the connection of said source and of said detecting means to the said sleeve conductor of said trunk and of said identified line and means for indicating the absence of said reverse detection and means for indicating the presence of said reverse detection and means responsive to an indication of the absence of said reverse detection to prevent the completion of the call and means responsive to an indication of the presence of said reverse detection to permit the completion of the call.

11. In a telephone system, a plurality of lines, a plurality of trunks, means for extending a connection from any calling one of said lines over any idle one of said trunks, means for indicating whether the traffic serviced by said lines and by said trunks represents a heavy or a light traffic condition, and a plurality of line identifiers any idle one of which is associable with said lines and with said trunks for determining the directory number of said calling line, said identifier comprising a source of signal current and means for applying current from said source to the trunk sleeve conductor of said extended connection and means associable with said lines for detecting said signal on the sleeve conductor of one of said lines and means responsive to such detection for initiating the identification of the digits of the directory number of the line associated with said sleeve conductor and means operable under light traffic conditions following the identification of the thousands digit to determine whether or not said sleeve conductor is connected with a sleeve conductor of another line and respectively to prevent and to allow completion of the identification and means responsive to the identification of the units digit of said directory number for reversing the connection of said source and of said detecting means to the sleeve conductors of said trunk and of said identified line and means to indicate the absence of said reverse detection and means to indicate the presence of said reverse detection and means responsive to an indication of the absence of said reverse detection to prevent the completion of the call and means responsive to an indication of the presence of said reverse detection to permit the completion of the call.

JOHN W. GOODERHAM.

REFERENCES CITED

The following references are of record in the file of this patent:

UNITED STATES PATENTS

| Number | Name | Date |
|---|---|---|
| 2,252,766 | Holden | Aug. 19, 1941 |
| 2,300,829 | Gooderham | Nov. 3, 1942 |
| 2,387,897 | Grandstaff | Oct. 30, 1945 |
| 2,428,376 | Mathies | Oct. 7, 1947 |